(12) United States Patent
Marshall et al.

(10) Patent No.: US 11,131,869 B2
(45) Date of Patent: Sep. 28, 2021

(54) OPHTHALMIC LENS WITH GRADED MICROLENSES

(71) Applicant: Vision Ease, LP, Ramsey, MN (US)

(72) Inventors: Michael Marshall, Andover, MN (US); José A. Orozco Rodriguez, Saint Paul, MN (US); Richard Blacker, Lino Lakes, MN (US)

(73) Assignee: Vision Ease, LP, Ramsey, MN (US)

( * ) Notice: Subject to any disclaimer, the term of this patent is extended or adjusted under 35 U.S.C. 154(b) by 146 days.

(21) Appl. No.: 16/503,272

(22) Filed: Jul. 3, 2019

(65) Prior Publication Data

US 2019/0324293 A1 Oct. 24, 2019

Related U.S. Application Data

(63) Continuation of application No. 15/130,831, filed on Apr. 15, 2016, now Pat. No. 10,386,654.

(60) Provisional application No. 62/148,102, filed on Apr. 15, 2015.

(51) Int. Cl.
*G02C 7/06* (2006.01)
*G02B 3/00* (2006.01)
*G02C 7/02* (2006.01)

(52) U.S. Cl.
CPC ............ *G02C 7/06* (2013.01); *G02B 3/0043* (2013.01); *G02C 7/022* (2013.01); *G02B 3/0012* (2013.01); *G02C 2202/16* (2013.01)

(58) Field of Classification Search
CPC ...... G02C 7/06; G02C 7/022; G02C 2202/16; G02C 7/10; G02B 3/0043; G02B 3/0012; B29D 11/00336; B29D 11/00009
See application file for complete search history.

(56) References Cited

U.S. PATENT DOCUMENTS

| | | | |
|---|---|---|---|
| 3,902,693 A | 9/1975 | Crandon et al. |
| 5,359,440 A | 10/1994 | Hamada et al. |
| 5,507,806 A | 4/1996 | Blake |
| 5,753,092 A | 5/1998 | Hollars et al. |
| 5,798,027 A | 8/1998 | Lefebvre et al. |
| 6,129,042 A | 10/2000 | Smith et al. |
| 6,258,218 B1 | 7/2001 | Burton |
| 7,679,828 B2 | 3/2010 | Munro |
| 10,268,050 B2 * | 4/2019 | To ............................ G02C 7/06 |
| 10,386,654 B2 | 8/2019 | Marshall et al. |
| 2002/0023837 A1 | 2/2002 | Stimson |
| 2002/0145979 A1 | 10/2002 | Baj |
| 2003/0210466 A1 | 11/2003 | Huang |
| 2005/0056125 A1 | 3/2005 | Trumper |
| 2008/0164147 A1 | 7/2008 | Dogi et al. |
| 2008/0223715 A1 | 9/2008 | Gibson et al. |

(Continued)

FOREIGN PATENT DOCUMENTS

DE 102012023478 A1 5/2014
GB 2411 290 A 8/2005
(Continued)

OTHER PUBLICATIONS

Indonesia Patent Office, Office Action dated Feb. 24, 2020 with English translation in Indonesian Patent Application No. PID201707550, 4 pages.

*Primary Examiner* — Tuyen Tra
(74) *Attorney, Agent, or Firm* — Inskeep IP Group, Inc.

(57) ABSTRACT

An ophthalmic lens incorporating an array of microlenses.

10 Claims, 12 Drawing Sheets

(56) References Cited

U.S. PATENT DOCUMENTS

| | | |
|---|---|---|
| 2008/0286458 A1 | 11/2008 | Kirchoff |
| 2009/0006017 A1 | 1/2009 | Young et al. |
| 2009/0025435 A1 | 9/2009 | Boettiger et al. |
| 2009/0225435 A1 | 9/2009 | Boettiger et al. |
| 2010/0183900 A1 | 7/2010 | Wallin et al. |
| 2012/0033120 A1 | 2/2012 | Nakamura et al. |
| 2013/0033636 A1 | 2/2013 | Pitts et al. |
| 2014/0016015 A1 | 1/2014 | Miao |
| 2014/0116986 A1 | 5/2014 | Akasaka |
| 2014/0327875 A1 | 11/2014 | Blum et al. |
| 2015/0160477 A1 | 6/2015 | Dai |
| 2015/0309332 A1 | 10/2015 | Hillenbrand et al. |
| 2017/0184875 A1 | 6/2017 | Newman |

FOREIGN PATENT DOCUMENTS

| | | |
|---|---|---|
| GB | 2 462 890 A | 3/2010 |
| WO | WO 2004/029324 A1 | 4/2004 |
| WO | WO 2006/087558 A2 | 8/2006 |
| WO | WO2009/100257 A2 | 8/2009 |
| WO | WO2012/138426 A2 | 10/2012 |
| WO | WO2012/138426 A3 | 10/2012 |
| WO | WO 2012/168709 A2 | 12/2012 |
| WO | WO2015/147758 A1 | 10/2015 |

\* cited by examiner

SV (Sph Measure) by transmission

OPHTHALMIC LENS WITH GRADED MICROLENSES

RELATED APPLICATIONS

This application is a continuation of and claims priority to U.S. patent application Ser. No. 15/130,831 filed Apr. 15, 2016 entitled Ophthalmic Lens With Graded Microlenses, which claims benefit of and priority to U.S. Provisional Application Ser. No. 62/148,102 filed Apr. 15, 2015, entitled Ophthalmic Lens with Graded Microlenses, both of which are hereby incorporated herein by reference in their entireties.

FIELD OF THE INVENTION

The present invention relates to ophthalmic lenses and, more particularly, to ophthalmic lenses employing one or more arrays of microlenses.

BACKGROUND OF THE INVENTION

In order to refract light, the common denominator in conventional ophthalmic lenses is the difference in curvature between the front surface and the back surface. However, this poses certain limitations in the design of certain high-end lenses such as prescription sunglasses and progressive lenses. In the case of prescription sunglasses, such design limitations result in prescription sunglasses typically only being available in a limited range of prescriptions. The choice of the curvature of the front surface of the lens (base curve) is determined by the geometry of the frame that wraps around the face. Most prescription sunglasses must, therefore, be made using base curves in the range of six to eight diopters. As a consequence, prescription sunglasses for wearers with a high degree of ametropia would present extremely thick edges in the case of high of myopes, or extremely thick centers in the case of high hyperopes. For this reason, prescription sunglasses are most commonly available for the population whose prescription is in the range of about minus three diopters to plus three diopters.

In the case of multifocal lenses, for example progressive addition lenses, PALs, such design limitations result in only small portions of the progressive addition lens being functional for different lens powers. The geometry of the continuous progressive surface makes it impossible for the lens designer to design lenses with large, wide, and clear regions all at once. Likewise, a design with a larger near region will have a narrower distance region and a design with a shorter corridor to fit a small frame will have more astigmatism, and so on.

Hence, there exists a need for ophthalmic lenses, lens designs, and methods for manufacturing ophthalmic lenses that provide relatively thin prescription clear lenses and sunglasses manufactured for any desired prescription. There also exists a need for ophthalmic lenses, lens designs, and methods for manufacturing ophthalmic lenses that provide for multifocal lenses that have relatively large optically functional portions for the different lens powers.

OBJECTS AND SUMMARY OF THE INVENTION

The present invention provides ophthalmic lenses, lens designs, and methods for manufacturing ophthalmic lenses that achieve relatively thin prescription sunglasses manufactured for any desired prescription. The present invention also provides ophthalmic lenses, lens designs, and methods for manufacturing ophthalmic lenses that achieve multifocal lenses that have relatively large optically functional portions for the different lens powers. These objectives are achieved, in part, by providing an ophthalmic lens comprising: a base lens substrate having a front optical surface and a back optical surface; and an array of microlenses incorporated into at least a portion of the base lens substrate.

These objectives are achieved, in part, by a multifocal ophthalmic lens comprising: a base lens substrate having a front optical surface and a back optical surface; and an array of microlenses incorporated into at least a portion of the base lens substrate, the array of microlenses comprising a first plurality of microlenses having a first optical power and a second plurality of microlenses having a second optical power different from the first optical power.

These objectives are achieved, in part, by a method for forming an ophthalmic lens comprising: obtaining a base lens substrate; and incorporating an array of microlenses across at least a portion of the base lens substrate.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
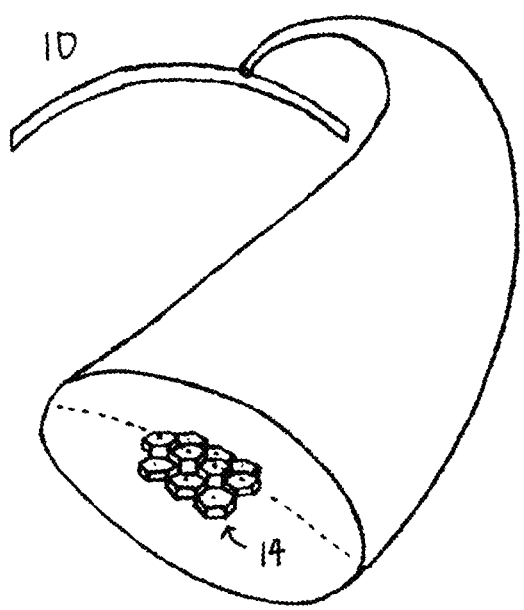
FIG. 1 is a partial perspective view of a microlens array according to one embodiment of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The present invention provides ophthalmic lenses, lens designs, and methods for manufacturing ophthalmic lenses that achieve relatively thin single vision prescription clear lenses and sunglasses manufactured for any desired prescription. The present invention also provides ophthalmic lenses, lens designs, and methods for manufacturing ophthalmic lenses that achieve multifocal lenses that have relatively large optically functional portions for the different lens powers. These objectives are achieved, in part, by providing ophthalmic lenses employing an array of microlenses formed thereon or therein. The individual microlenses of the array of microlenses function as microprisms that refract light by having front and back surfaces oriented in different directions and/or by having different refractive indices. Accordingly, the individual microlenses of the array of microlenses may have the same or distinct optical powers.

Figure 2:
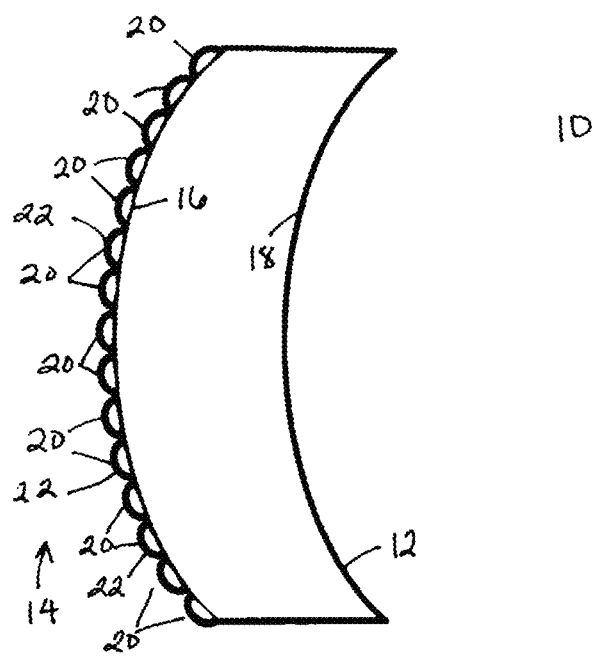
FIG. 2 is a cross-sectional view of a lens employing a microlens array according to one embodiment of the present invention.
Figure 3:
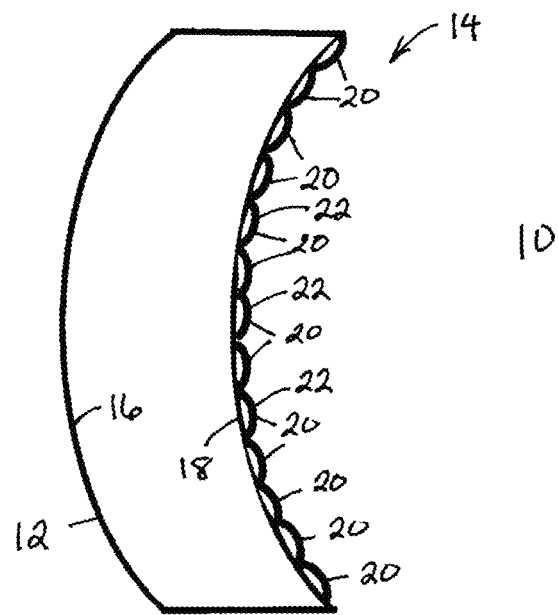
FIG. 3 is a cross-sectional view of a lens employing a microlens array according to one embodiment of the present invention.
Figure 8:
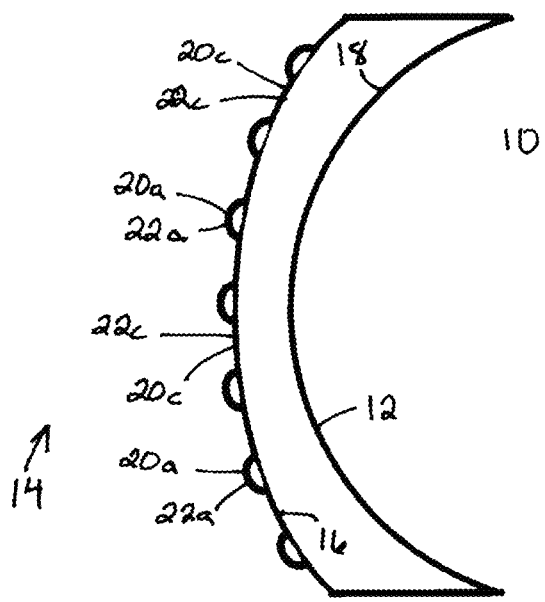
FIG. 8 is a cross-sectional view of a lens employing a microlens array according to one embodiment of the present invention.

With reference to FIGS. 1-3, a lens 10 according to the present invention employs a base lens 12 and a microlens array 14 formed on a front side or front optical surface 16 of the lens 10; formed on a back side or back optical surface 18 of lens 10; or formed on the front optical surface 16 and the back optical surface 18 of lens 10. The microlens array 14 is formed of a plurality of individual microlenses 20. The lens 10 may, but need not necessarily, employ an optical power, i.e. the front side 16 and the back side 18 of the lens 10 may have different base curves, as shown in FIG. 8.

Figure 4:
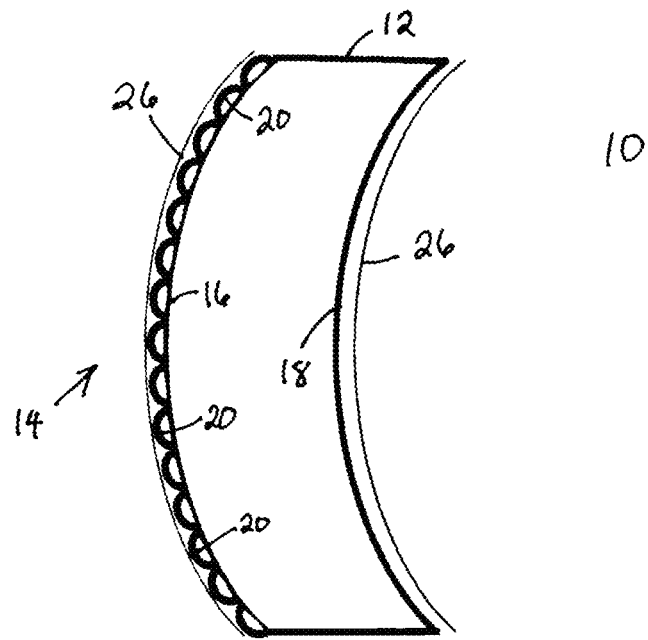
FIG. 4 is a cross-sectional view of a lens employing a microlens array according to one embodiment of the present invention.

For the sake of clarity and explanation and with reference to FIG. 4, the base curve of the front optical surface 16 and the base curve of the back optical surface 18 of the lens 10 that contains the geometric center of certain of the microlens 20 of array 14 is referred to as the "low-frequency" curvature 26 of the surface of the lens 10. The local curvature of the optical surface 22 of each microlens 20 is referred to as the "effective curvature" of the lens 10.

Figure 5:
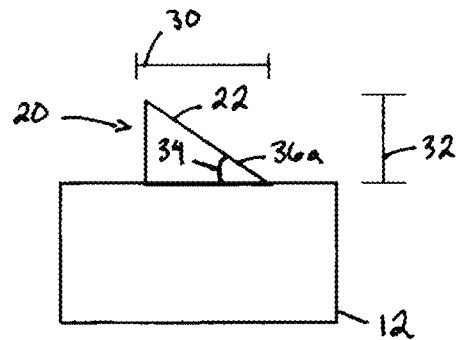
FIG. 5 is a cross-sectional view of a portion of a lens employing a microlens array according to one embodiment of the present invention.
Figure 6:
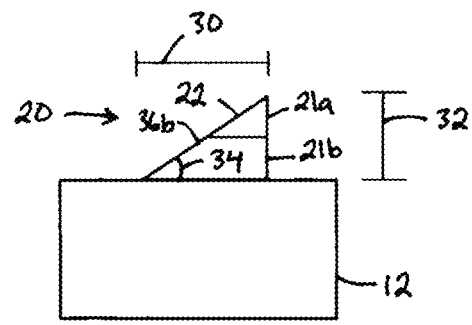
FIG. 6 is a cross-sectional view of a portion of a lens employing a microlens array according to one embodiment of the present invention.

The individual microlenses 20 of a single array 14 are formed of a single material, as shown in FIG. 5, or, alternatively, are formed of two or more different materials, as shown in FIG. 6. Alternatively stated, the individual microlenses 20 may have a homogenous composition or may have a heterogeneous composition. In the case of microlenses 20 having a heterogeneous composition, layers $21a$, $21b$ ... $21n$, of the different materials may be stacked upon one another so as to form a multilayered microlens 20 when viewed in elevation or viewed substantially parallel to the surfaces 16 and/or 18 of lens 10. While FIG. 6 shows the layers $21a$, $21b$ ... $21n$, oriented in a plane parallel to the front side 16 of the lens base 12, it will be understood that the orientation of the layers $21a$, $21b$ ... $21n$ can vary, in part, due to the desired manufacturing method and the desired refraction of the microlens 20.

The microlenses 20 of the microlens array 14 of the present invention may be formed of a variety of different materials depending on the desired refractive index of the microlens and on the manufacturing process employed for formation of the array 14, base lens 12, and/or lens 10. For example, microlenses 20 of the microlens array 14 of the present invention may be formed of a bulk lens material, such as polymeric resins suitable for injection molding, e.g. polycarbonate, or monomers suitable for cast molding; a titanium oxide having a refractive index of approximately 1.9 to 2.3, e.g. titanium dioxide; a zirconium oxide having a refractive index of approximately 1.88 to 2.1, e.g. zirconium dioxide; a tantalum oxide having a refractive index of approximately 2.07 e.g. tantalum pentoxide; a niobium oxide having a refractive index of approximately 2.1 to 2.35, e.g. niobium pentoxide; aluminum oxide having a refractive index of approximately 1.7 to 1.9; indium tin oxide having a refractive index of approximately 1.7 to 1.9; a tin oxide having a refractive index of approximately 1.9 to 2.0, e.g. tin dioxide; silicon oxynitride having a refractive index of approximately 1.5 to 2.0; and silicon nitride having a refractive index of approximately 2; or combinations thereof.

The microlenses array 14 is formed, for example, of microlenses 20 that are formed of a same material or materials, i.e. the microlenses 20 of a single array 14 are formed of a homogeneous material or materials, or, alternatively, the microlenses 20 of a single array 14 are formed of a heterogeneous material or materials. For example, the individual microlenses 20 of a single array 14 may be formed of different materials having different refractive indices.

The microlens array 14 is formed, for example, of a same material from which the base lens 12 is formed; of a material or materials that are different or distinct from the material from which the base lens 12 is formed, or of a combination of a same material from which the base lens 12 is formed and one or more materials that are different or distinct from the material from which the base lens 12 is formed. For example, the base lens 12 and some or all of the microlenses 20 of the array 14 may be formed of different materials having different refractive indices.

Figure 7:
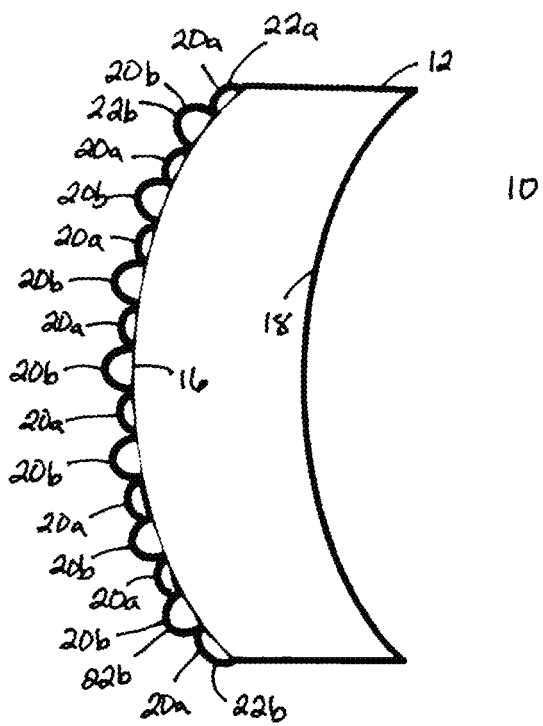
FIG. 7 is a cross-sectional view of a lens employing a microlens array according to one embodiment of the present invention.

The individual microlenses 20 of the array 14 of the inventive lens 10 are formed such that optical surfaces 22 of the individual microlenses 20 have a substantially same geometry as one another, for example as shown in FIGS. 2-6. Alternatively, the individual microlenses 20 of the array 14 are formed such that the microlenses 20 within a single array 14 have two or more substantially different or distinct geometries as one another. For example, as shown in FIG. 7, the array 14 of the lens 10 employs microlenses 20a and 20b having a first optical surface geometry 22a and a second optical surface geometry 22b, respectively.

FIG. 8 shows another example in which the array 14 of the lens 10 employs microlenses 20a and 20c having a first optical surface geometry 22a and a third optical surface geometry 22c, respectively. The optical surface geometry 22c of the microlenses 20 has an optical surface geometry that is different from the optical surface geometry 22a and that is substantially the same as the base curve of the front surface 16 of lens 10. Hence, the optical power of the microlenses 20 employing the third optical surface geometry 22c is a function of the optical power of the base lens 12.

For the sake of clarity, it will be understood that the geometry of the optical surface 22 of the microlens 20 may, but need not necessarily, be a property that primarily functions to define the optical power of the microlens 20. For example, the optical power of the microlens may be primarily defined by the refractive index from which the microlens 20 is formed rather than the geometry of the optical surface 22 of the microlens 20. For example, the base lens 12 and some or all of the microlenses 20 of the array 14 may be formed of different materials having different refractive indices.

Figure 9:
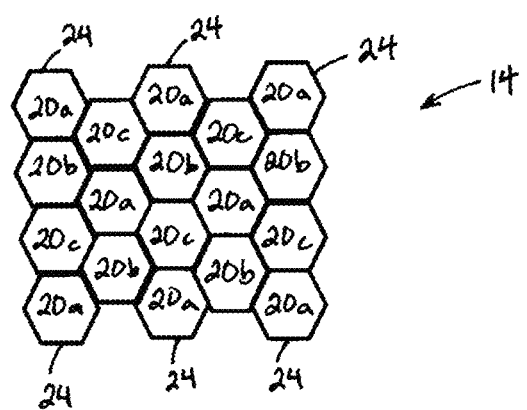
FIG. 9 is a plan view of a portion of a microlens array according to one embodiment of the present invention.
Figure 10:
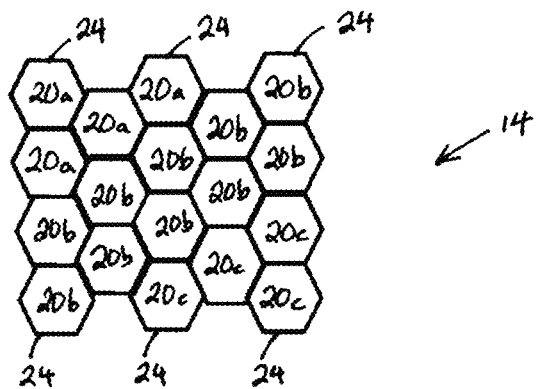
FIG. 10 is a plan view of a portion of a microlens array according to one embodiment of the present invention.
Figure 11:
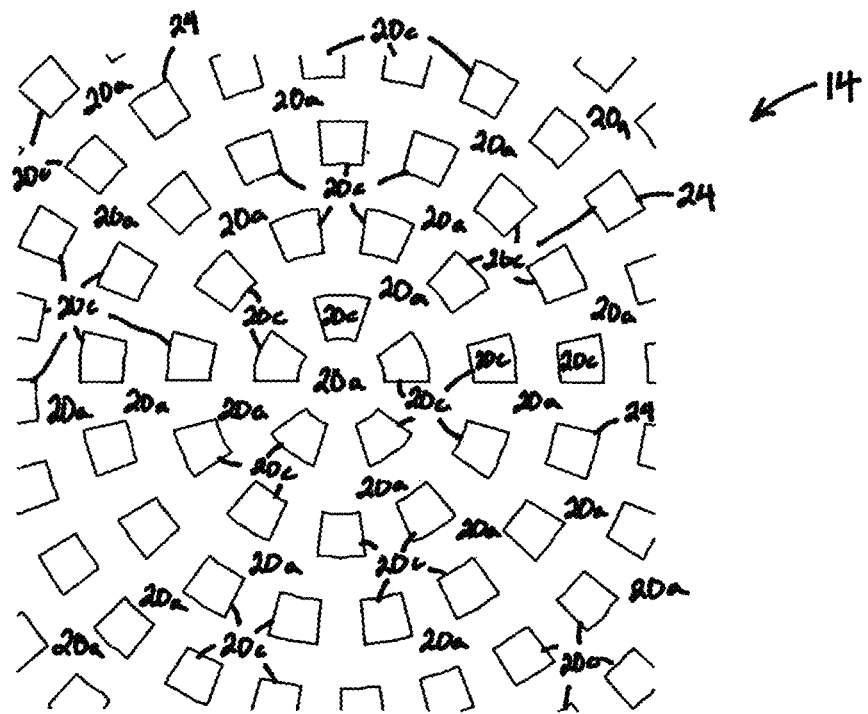
FIG. 11 is a plan view of a portion of a microlens array according to one embodiment of the present invention.

As shown in FIGS. 9-11, a shape of the individual microlenses 20 of the array 14 when viewed in plan or perpendicular to the surfaces 16 and/or 18 of lens 10, i.e. a shape defined by a periphery 24 of the microlens 20, is for example rectangular, trapezoidal, regular polygonal, such as hexagonal, irregular polygonal, or any other shape. A single array 14 may employ microlenses 20 having the same or different shapes defined by the periphery 24 of the microlens 20. A maximum width, diameter, or dimension 30, shown in FIGS. 5 and 6, of the shape defined by a periphery 24 of the microlens 20 is in the range of approximately 0.001 to 0.5 millimeters, for example 0.4 millimeters or 0.2 millimeters.

A cross-sectional shape of the individual microlenses 20 of the array 14 when viewed in elevation or substantially parallel to the surfaces 16 and/or 18 of lens 10 is, for example semi-circular, curved, rectangular, trapezoidal, regular polygonal, irregular polygonal, triangular, stepped, concaved, convexed, or any other shape, as shown in the accompanying figures. A maximum thickness or dimension 32, shown in FIGS. 5 and 6, of the cross-sectional shape of the individual microlenses 20 of the array 14 from the front surface 16 or back surface 18 of the base lens 12 is, in part, dependent on the thickness of the base lens 12 and the properties, for example the refractive index, of the material from which the microlens 20 is formed. The maximum height or dimension 32 of the microlenses 20 may be in the range of 100 angstroms to 0.1 millimeters.

In embodiments in which the microlenses 20 of array 14 are asymmetric in the cross-sectional shape of the individual microlenses 20 of the array 14 when viewed in elevation or substantially parallel to the surfaces 16 and/or 18 of lens 10, the optical surface 22 may define a slope or angle 34 relative to a plane of the front surface 16 or back surface 18 of the base lens 12 or a tangent of the curvature of the front surface 16 or back surface 18 of the base lens 12. The optical surface 22 may define a relative sign 36 of the optical surface 22. For example, FIG. 5 shows an individual microlens 20 having an optical surface 22 with a minus or negative sign 36a, and FIG. 6 shows an individual microlens 20 having an optical surface 22 with a positive or plus sign 36b. It will be understood by those skilled in the art that the sign of microlenses 20 having the same cross-sectional shape when viewed in elevation or substantially parallel to the surfaces 16 and/or 18 of lens 10 will vary depending on the orientation of the asymmetry relative to the base curvature of the lens.

In view of the above, it will be understood that the optical power of an individual microlens 20 of an array 14 may be defined by one or a combination of the properties of the microlens 20 including, but not limited to, the material employed to form the individual microlens 20, the geometry of the optical surface 22, the angle 34 of the optical surface 22, and the orientation of an asymmetry of the optical surface 22.

A single array 14 according to the present invention can be formed of individual microlenses 20 that are the same or that vary in the shape defined by the periphery 24 of the microlens 20; the maximum width, diameter, or dimension 30; the cross-sectional shape of the individual microlenses 20 of the array 14 when viewed in elevation or substantially parallel to the surfaces 16 and/or 18 of lens 10 is; the maximum thickness or dimension 32; the angle 34 of the optical surface 22; and/or in the sign 36 of the optical surface 22.

In embodiments in which the microlenses 20 of array 14 are asymmetric in the shape defined by the periphery 24 of the microlens 20 and/or in the cross-sectional shape of the individual microlenses 20 of the array 14 when viewed in elevation or substantially parallel to the surfaces 16 and/or 18 of lens 10, such asymmetric microlenses 20 may be oriented uniformly throughout the array 14 relative to one another or may be oriented non-uniformly throughout the array 14 relative to one another.

In embodiments in which a single array 14 employs individual microlenses 20 having different optical powers, for example, microlenses 20a for far vision; microlenses 20b for intermediate vision; and/or microlenses 20c for near vision, may be uniformly distributed across the area of the array 14, as shown in FIG. 9, or may be non-uniformly distributed across the area of the array 14, as shown in FIG. 10. Alternatively, the single array 14 employing individual microlenses 20 having different optical powers may have the form of concentric rings or ovals, as shown in FIG. 11. For example, a multifocal lens having a prescription that is plano for far vision, plus one diopter for intermediate vision, and plus two diopters for near vision may be desired. A low frequency curvature of the front surface of the lens is plus four diopters. Accordingly, the effective curvature of the microlenses is plus four diopters, plus five diopters, and plus six diopters for the far, intermediate, and near vision, respectively.

Figure 12:
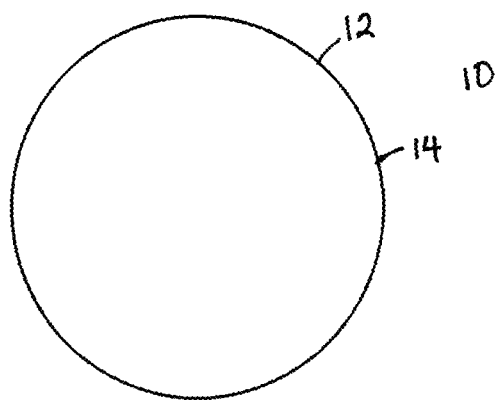
FIG. 12 is a plan view of a lens employing a microlens array according to one embodiment of the present invention.
Figure 13:
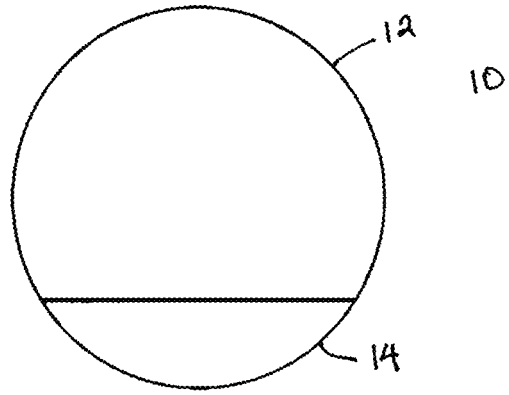
FIG. 13 is a plan view of a lens employing a microlens array according to one embodiment of the present invention.

The array 14 may cover, be formed over, or be incorporated through an entirety of the front side 16 and/or back side 18 of the lens 10, as shown in FIG. 12. Alternatively, the array may be covered, be formed over, or incorporated through only a portion of the front side 16 and/or back side 18 of the lens 10 as shown in FIG. 13. For example, as shown in FIG. 13, the array 14 may be localized to only a lower or upper portion of the lens 10 such that the portion of the lens 10 not employing array 14 provides a user with an optical power and the portion of the lens 10 employing the array 14 provides the user with one or more different optical powers. Accordingly, in certain embodiments of the present invention the same optical effect as those of typical bifocal, trifocal, or executive trifocal lens is achieved. However, the present invention provides such without the sharp steps that are visible at a macro-scale in conventional multifocal lenses and with larger functional areas of different optical powers. Furthermore occupational specific lenses may also be easily realized by the present invention.

For the sake of clarity, it will be understood that in the accompanying figures and drawings the features of the present invention, for example the base lens 12, the array 14, and the microlenses 20, are shown so as to facilitate understanding of the present invention and are not shown to scale generally or relative to one another.

In one embodiment according to the present invention, all of the microlenses 20 of the array 14 of lens 10 are formed of individual microlenses 20 formed of the same material or materials and are formed so as to have substantially the same optical surface geometry. The array 14 is formed uniformly over an entirety or a substantial entirety of the front optical surface 16 of lens 10 and/or over an entirety or substantial entirety of the back optical surface 18 of lens 10. The material from which the array 14 is formed may, but need not necessarily, be the same materials from which the lens base 12 is formed. The lens 10 advantageously provides a relatively thin, single focal power lens, for example, a relatively thin single vision sunglass lens.

Figure 14:
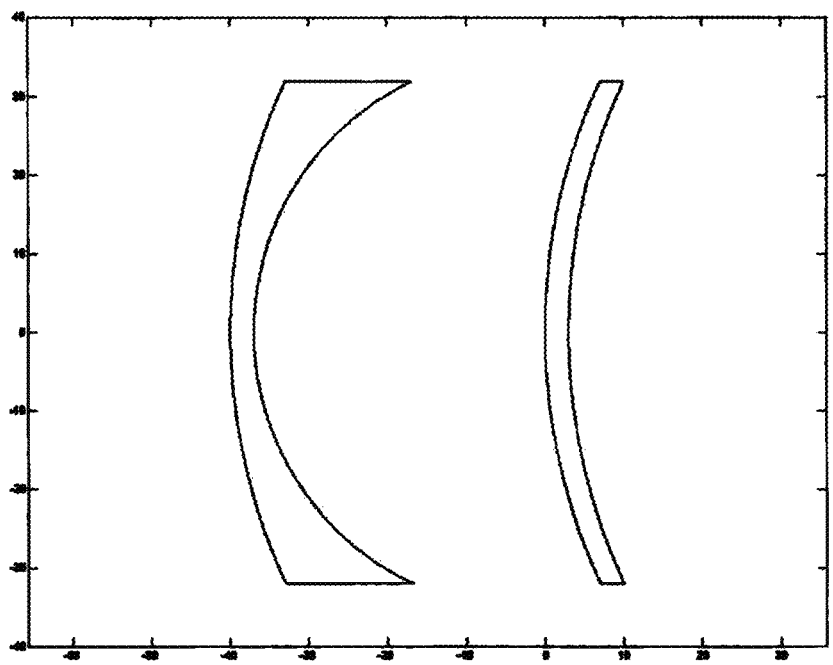
FIG. 14 is a comparison of cross-sectional views of a typical ophthalmic lens and a lens employing a microlens array according to one embodiment of the present invention.
Figure 15:
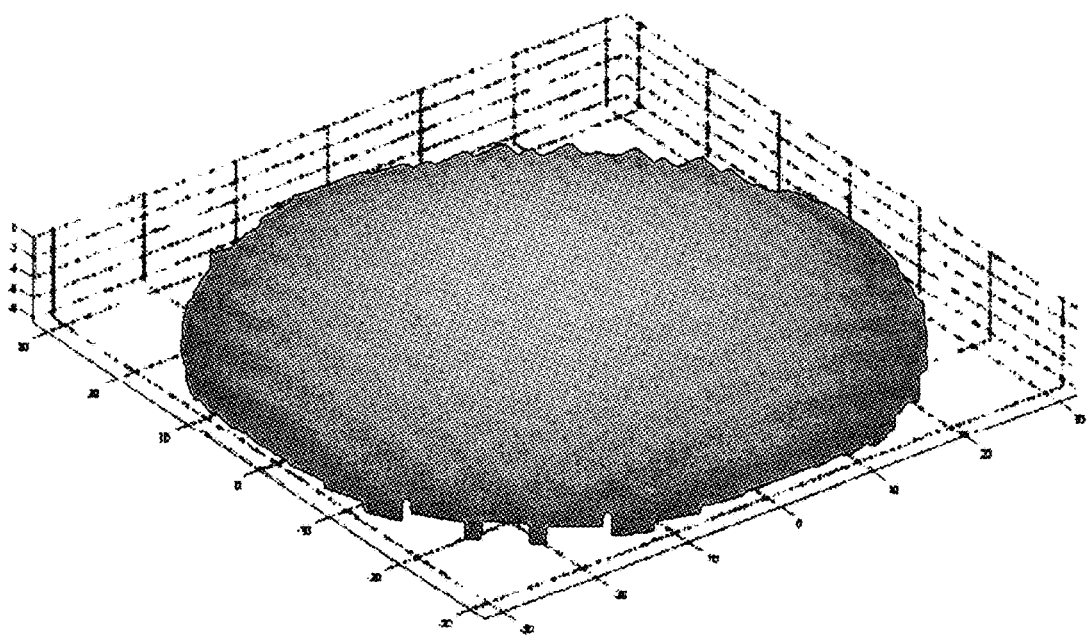
FIG. 15 is a perspective view of a lens employing a microlens array according to one embodiment of the present invention.

In the present embodiment in which a single vision prescription lens, e.g. a sunglass lens, is designed and manufactured according to the present invention, the lens 10 is, for example, manufactured with a low-frequency curvature 26 of plus seven diopters so as to fit properly into, for example, a wrap-around style sunglass lens frame. If the target prescription for the lens 10 is minus ten diopters, then each microlens 20 of the array 14 of lens 10 is produce with a concave effective curvature, in this case, with minus three diopters, so as to achieve the target prescription. For the sake of clarity, this example employs the thin lens formula approximation that ignores refractive index and lens thickness and approximates lens powers by adding the front and back surface power. For example, minus 10 lens power equals minus three plus minus seven. FIG. 14 shows a comparison of a typical minus ten diopters lens, left, relative to a ten diopters lens 10 according to the present invention, right. FIG. 15 shows the array 14 on the front surface 16 of the lens 10 according to the present invention.

Figure 16:
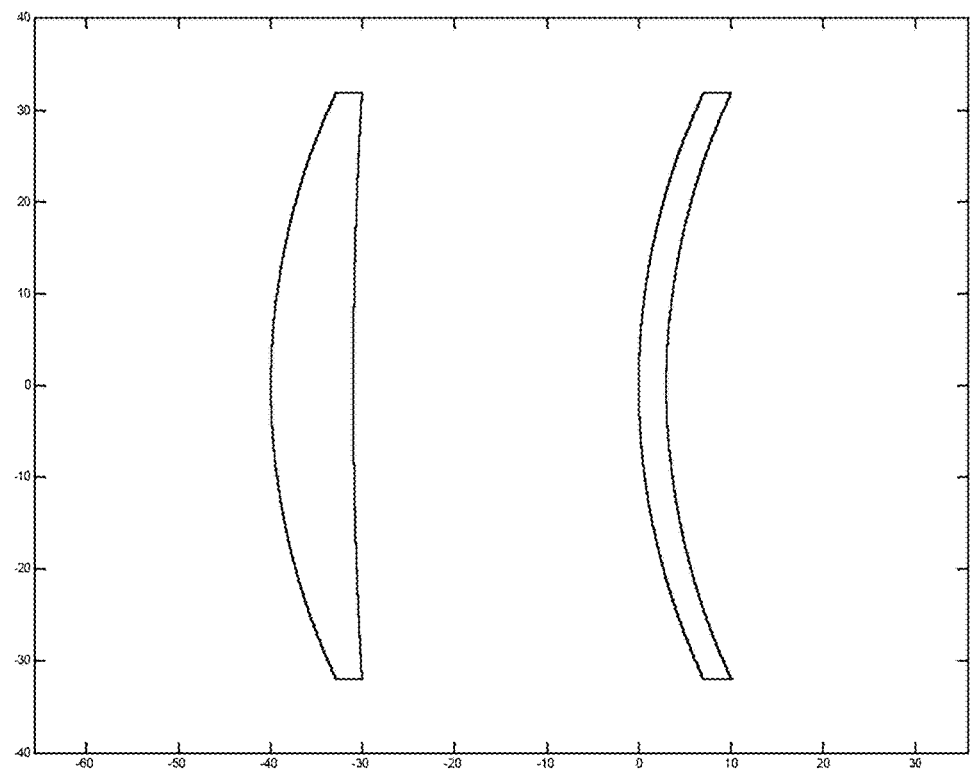
FIG. 16 is a comparison of cross-sectional views of a typical ophthalmic lens and a lens employing a microlens array according to one embodiment of the present invention.
Figure 17:
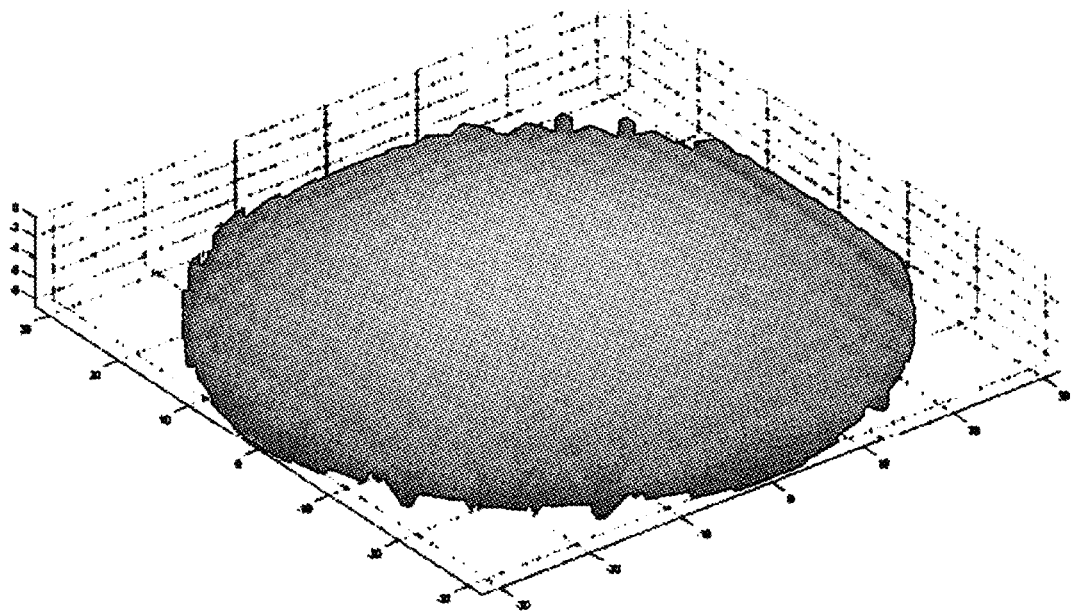
FIG. 17 is a perspective view of a lens employing a microlens array according to one embodiment of the present invention.

In a second example of the present embodiment, the lens 10 is, for example, manufactured with a low-frequency curvature 26 of plus seven diopters so as to fit properly into, for example, a wrap-around style sunglass lens frame. If the target prescription for the lens 10 of this example is plus six diopters, then each microlens 20 of the array 14 of lens 10 is produce with an effective curvature of plus 13 diopters, so as to achieve the target prescription. Again, this example employs the thin lens formula approximation that ignores refractive index and lens thickness and approximates lens powers by adding the front and back surface power. For example, plus six lens power equals the sum of plus 13 lens power and minus seven. FIG. 16 shows a comparison of a typical plus six diopters lens, left, relative to a six diopters lens 10 according to the present invention, right. FIG. 17 shows the array 14 on the front surface 16 of the lens 10 according to the present invention. For the sake of clarity, the individual microlenses 20 of the array 14 shown in FIGS. 15 and 17 are shown as having a square shape with a diameter of approximately 0.4 millimeters. It will be understood by those skilled in the art that the present embodiment is not limited to application in single vision ophthalmic sunglasses.

The lens 10 having array 14 of the present invention allows for the fabrication of single vision lenses having a low-frequency curvature 26 formed with most any optical power that are thinner than is typically possible without resort to more costly high index lens materials. Accordingly, the present embodiment advantageously allows for increased flexibility in choice of frame and prescription combinations (currently limited by curvature of lens), choice of thinner lenses in any frame, and optimization of appearance and safety functions.

In a another embodiment of the present invention, the microlenses 20 of the array 14 of the lens 10 are formed of individual microlenses 20 formed of the same material or materials but that have two or more substantially different optical surface geometries. The array 14 is incorporated into or formed uniformly over a portion or over an entirety of the front optical surface 16 of lens 10. Such a lens 10 advantageously provides, in part, a multifocal lens, such as a bifocal, trifocal, or executive trifocal lens, with large functional areas of different optical powers while not exhibiting sharp steps that are visible at a macro-scale.

For example, with reference to FIG. 7, the array 14 of lens 10 may employ microlenses 20a and 20b that are formed of a same material or materials. However, the microlens 20a has an optical surface geometry 22a that is different or distinct from the optical surface geometry 22b of the microlens 20b. In this example of the present embodiment, the array is formed over an entirety of the front side 16 of the lens 10. Hence, any difference in the materials employed to form base lens 12 and the array 14 is not relevant to the optical powers of the microlenses 20a and 20b relative to one another.

In a further embodiment according to the present invention, the microlenses 20 of the array 14 of the lens 10 are formed of individual microlenses 20 formed so as to have substantially the same optical surface geometry but the individual microlenses 20 are formed from different or distinct materials. The array 14 is formed uniformly over a portion or over an entirety of front optical surface 16 of lens 10. The microlenses 20 formed of different materials of the array 14 may be uniformly distributed across the area of the array 14, as shown in FIG. 9, or may be non-uniformly distributed across the area of the array 14, as shown in FIG. 10. Such a lens 10 advantageously provides a multifocal lens, such as a bifocal, trifocal, or executive trifocal lens, with large functional areas of different optical powers while not exhibiting sharp steps that are visible at a macro-scale.

Figure 18:
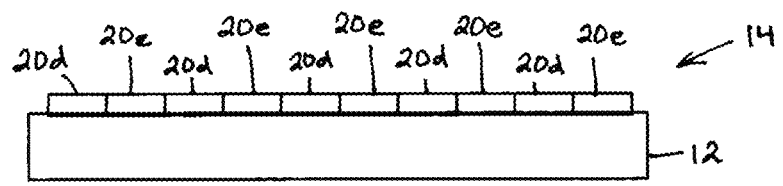
FIG. 18 is a cross-sectional view of a lens employing a microlens array according to one embodiment of the present invention.

For example, with reference to FIG. 18, a user may have a prescription having a sphere of plus four diopters and an addition of plus two diopters. A lens 10 according to one embodiment of the present invention for this user may have a distant portion employing microlenses 20d formed of a material having a refractive index of 1.530 with a front side 16 low frequency curvature 26 of plus six diopters and a back side 18 low frequency curvature 26 of minus two diopters, such as that shown in FIG. 2. For the power addition portion of the lens 10, the lens 10 may employ microlenses 20e formed of a material having a refractive index of 1.795 with a front side 16 low frequency curvature 26 of plus six diopters and a back side 18 low frequency curvature 26 of minus two diopters. In this example of the present embodiment, the base lens 12 is a plano power thin lens with a front curve of plus two diopters and a back curve of minus two diopters. The different microlenses 20d of the distant portion and the microlenses 20e of the power addition of the array 14 may be arranged or grouped as shown in FIGS. 9-11.

According to the above described example of the present embodiment, the type of materials employed to form the individual microlenses 20 within the array 14 is varied between individual microlenses 20 of a single array 14 and the individual microlenses 20 are composed of only one material each. In other words, the material employed to form the array 14 varies across the array 14, but the individual microlenses 20 of the array 14 are each formed of only a single material. This example of the present embodiment is not limited to employing only two different materials within or across the array 14. The array 14 may employ more than two materials, for example, three different materials so as to create three unique optical powers.

Figure 19:
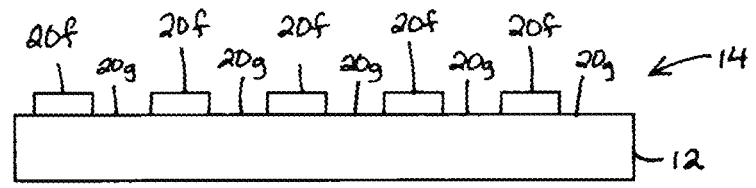
FIG. 19 is a cross-sectional view of a lens employing a microlens array according to one embodiment of the present invention.

In a second example of the present embodiment, in order to form the desired multifocal lens of the present embodiment, the microlenses 20 of array 14 are formed of different materials across the thickness 32 of the microlens 20 and/or the base lens 12. A single or individual microlens 20 may be formed of one or more layers of different or heterogeneous materials as described with respect to FIG. 6. With reference to FIG. 19, the array 14 of the lens 10 is formed of microlenses 20f and microlenses 20g. The microlenses 20g are defined or formed between the microlenses 20f and/or by the absence of material employed to form microlenses 20f employed over the surface 16 or 18 of the base lens 12. Hence, the optical power of microlenses 20g are primarily a function of the optical power of the base lens 12.

In this example, the base lens 12 is formed of a material having a refractive index of approximately 1.6. Hence, the microlenses 20g of the array 14 are regarded as also being formed of a material having a refractive index of approximately 1.6. On the other hand, the microlenses 20f of the array 14 are formed of a material deposited upon the surface 16 or 18 of the base lens 12 that has a refractive index of 2.2 and of the base material having a refractive index of approximately 1.6.

The different microlenses 20d of the distant portion and the microlenses 20e of the power addition of the array 14 may be arranged or grouped as shown in FIGS. 9-11. This example of the present embodiment is not limited to employing only two different materials within or across the array 14 and is not limited to employing the shape defined by a periphery 24 of the microlens 20 as shown FIGS. 9-11. The array 14 may employ more than two materials, for example, three different materials so as to create three unique optical powers.

In the above described examples of the present embodiment, it is noted that the microlenses 20d, 20e, 20f, and 20g shown in FIGS. 18 and 19 are formed such that the optical surfaces 22 of the individual microlenses 20d, 20e, 20f, and 20g have substantially the same optical surface geometry as one another. Asymmetries in the geometry of the optical surface, i.e. a prism angle, and the orientation of such asymmetric individual microlenses 20 will depend both on the desired optical power of the individual microlens 20, as well as on the location of the microlens 20 within the array 14 and on the lens 10. The optical power of the individual microlenses 20d, 20e, 20f, and 20g is defined by the refractive index of the material employed to form the individual microlenses 20d, 20e, 20f, and 20g and the prism angle and orientation of the surface 22, such as shown in FIGS. 5 and 6. The present embodiment provides multifocal power lenses that have a substantially constant front and back low frequency curvature 26 over the entire front side 16 and back side 18 of the lens 10.

In yet another embodiment according to the present invention, the microlenses 20 of the array 14 of lens 10 are formed of individual microlenses 20 formed from different or distinct materials and are formed so as to have two or more substantially different optical surface geometries. The array 14 is formed uniformly over a portion or over an entirety of the front optical surface 16 of lens 10. Such a lens 10 advantageously provides a multifocal lens, such as a bifocal, trifocal, or executive trifocal lens, with large functional areas of different optical powers while not exhibiting sharp steps that are visible at a macro-scale.

For example, with reference to FIG. 8, the array 14 is formed of a material or materials that are different or distinct from the material from which the base lens 12 is formed and the microlenses 20 of the array 14 are formed such that the optical surfaces 22a and 22c of the individual microlenses 20a and 20c have two or more substantially different or distinct geometries. As shown in FIG. 8, the microlenses 20c are defined or formed between the microlenses 20a and by the absence of material employed to form microlenses 20a employed over the surface 16 of the base lens 12. Hence, the optical power of microlenses 20c is primarily a function of the optical power of the base lens 12.

In this example of the present embodiment, the array is formed over an entirety of the front side 16 and/or the back side 18 of the lens 10. The different microlenses 20a and the microlenses 20c of the array 14 may be arranged or grouped as shown in FIGS. 9-11. The present embodiment provides multifocal power lenses that have a substantially constant front and back low frequency curvature 26 over the entire front side 16 and back side 18 of the lens 10.

Figure 20:
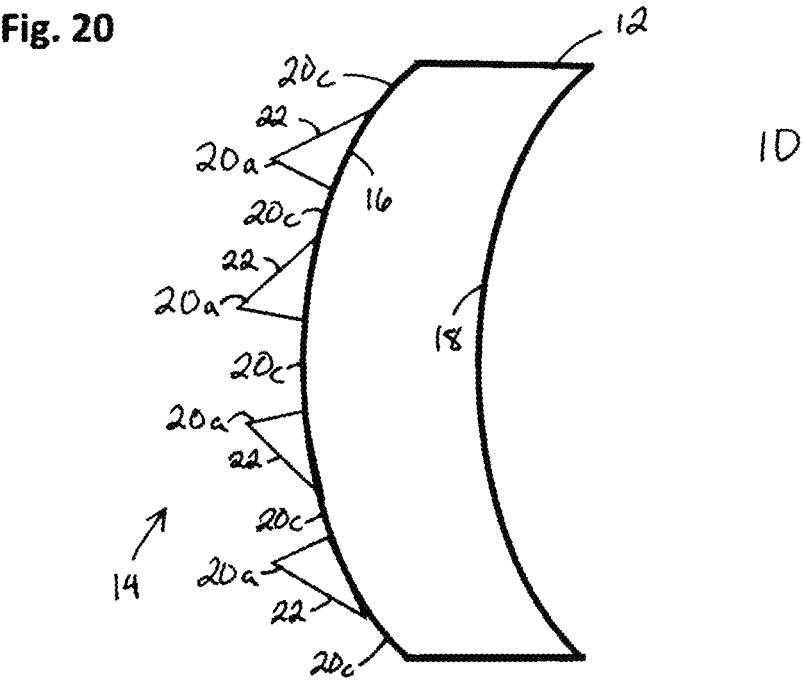
FIG. 20 is a cross-sectional view of a lens employing a microlens array according to one embodiment of the present invention.

In a second example of the present embodiment, the array 14 of lens 10 is formed substantially the same as that described in the above-described first example of the present embodiment. However, as shown in FIG. 20, the asymmetries of the cross-sectional shape of the individual microlenses 20a of the array 14 having the same optical surface geometries when viewed in elevation or substantially parallel to the surfaces 16 and/or 18 of lens 10 are oriented across the array 14 in different or opposing orientations. In this example, the base lens 12 is formed plano. Hence, the optical power of the microlenses 20c is zero while the optical power of the microlenses 20a is, for example plus two diopters.

In this example of the present embodiment, the array is formed over an entirety of the front side 16 and/or back side 18 of the lens 10. The different microlenses 20a and the microlenses 20c of the array 14 may be arranged or grouped as shown in FIGS. 9-11. The present embodiment provides multifocal power lenses that have a substantially constant front and back low frequency curvature 26 over the entire front side 16 and back side 18 of the lens 10.

Figure 21:
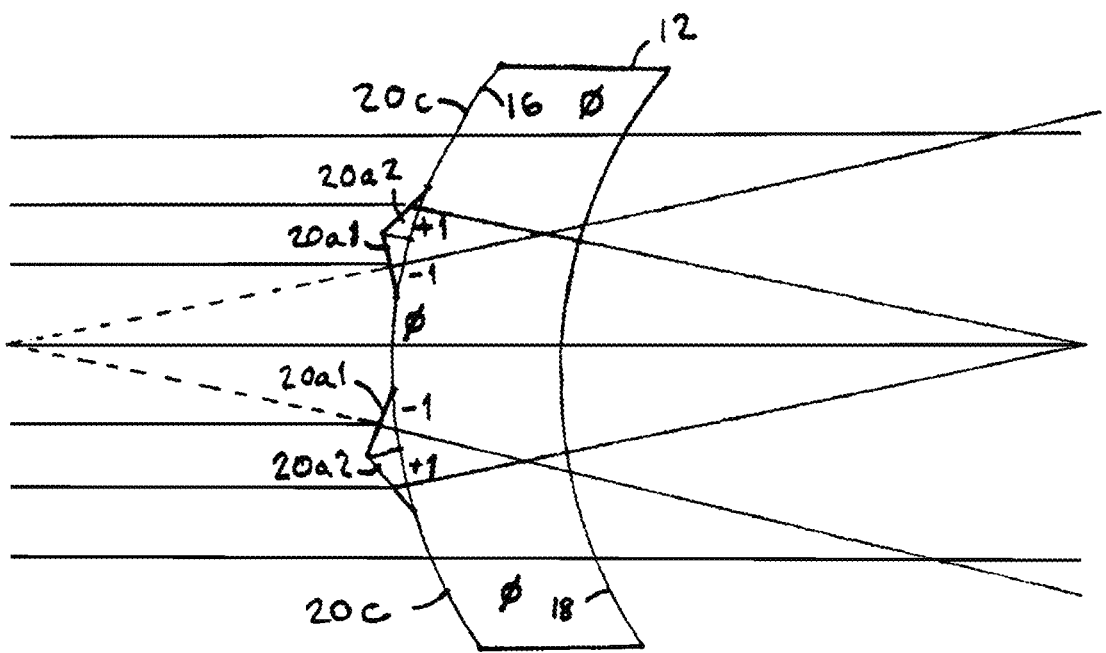
FIG. 21 is a cross-sectional view of a lens employing a microlens array according to one embodiment of the present invention.

In a third example of the present embodiment, in order to form the desired multifocal lens of the present embodiment, the microlenses 20 of array 14 are formed of different materials across the thickness 32 of the microlens 20 and/or the base lens 12; are formed so as to have two different optical surface geometries; and the asymmetries of the cross-sectional shape of the individual microlenses 20 of the array 14 having the same optical surface geometries when viewed in elevation or substantially parallel to the surfaces 16 and/or 18 of lens 10 are oriented across the array 14 in different or opposing orientations. A single or individual microlens 20 may be formed of one or more layers of the different or heterogeneous materials as described with respect to FIG. 6. With reference to FIG. 21, the array 14 of the lens 10 is formed of microlenses 20a1 having a minus sign 36; microlenses 20a2 having a plus sign 36; and microlenses 20c. The microlenses 20c are defined or formed between certain of the microlenses 20a1 and 20a2 and/or by the absence of material employed to form microlenses 20c employed over the surface 16 or 18 of the base lens 12.

In this example, the base lens 12 is formed plano. Hence, the optical power of the microlenses 20a1 is minus one diopter. The optical power of the microlenses 20a2 is plus one diopter, and the optical power of the microlenses 20c is zero diopter, as indicated in the right side of FIG. 20.

In a fourth example of the present embodiment, the array 14 of lens 10 is formed substantially identical as that described in the above-second example of the present embodiment. However, the base lens 12 is formed with a power of plus four diopters. Hence, the optical power of the microlenses 20a1 is plus three diopters. The optical power of the microlenses 20a2 is plus 5 diopters, and the optical power of the microlenses 20c is plus four diopters, as indicated in the right side of FIG. 22.

In the third and fourth examples of the present embodiment, the array is formed over an entirety of the front side 16 and/or back side 18 of the lens 10. The different microlenses 20 of the array 14 may be arranged or grouped as, for example, shown in FIGS. 9-11. The present embodiment provides multifocal power lenses that have a substantially constant front and back low frequency curvature 26 over the entire front side 16 and back side 18 of the lens 10.

By way of comparison, the array 14 of the third and fourth examples of the present embodiment may in certain situations provide advantages over the array 14 of the second example of the present embodiment described above and shown in FIG. 20. For example, the back-to-back or opposing sign 36 configuration of the adjacent microlenses 20a1 and 20a2 allows for increased differentials of optical powers of adjacent microlenses 20 while employing decreased maximum thickness or dimensions 32 of the respective microlenses 20 relative to the array 14 of the second example of the present embodiment. In other words, in order for the array 14 of the second example to achieve, for example, a plus two diopter differential between adjacent microlenses 20a and 20c, without increasing a maximum width or dimension 30, of the shape defined by a periphery 24 of the microlens 20a, the microlenses 20a must have an increased maximum thickness or dimension 32 and an increased angle 34 of the respective microlenses 20a relative to the microlenses 20a1 and 20a2 of the third and fourth examples.

In certain embodiments of the present invention, the microlenses 20 of the array 14 are formed on the front surface 16 and/or the back surface 18 of the base lens 12 by what is referred to as subtractive methods. For example, the microlenses 20 of the array 14 are formed on the front surface 16 and/or the back surface 18 of the base lens 12 by the direct machining or mechanical etching of the front surface 16 and/or the back surface 18 of the base lens 12.

In certain embodiments, the formation of the microlenses 20 of the array 14 by the direct machining or mechanical etching of the front surface 16 and/or the back surface 18 of the base lens 12 is employed with laminate base lenses formed of two or more base materials having different refractive indices. For example, the front surface 16 of the base lens 12 is formed of a relatively thin layer of a high index polymeric material and the back surface is formed with a thicker layer of a lower index material. During the direct machining or etching of the front surface 16, certain of the microlenses 20 of the array 14 are formed by removal of a portion or an entire thickness of the relatively thin layer of a high index polymeric material. Other of the microlenses 20 of the array 14 are formed by the portions of the high index polymeric material that are not machined or mechanically etched from the front surface 16 of the base lens 12.

Alternatively, in certain embodiments of the present invention, the microlenses 20 of the array 14 are formed on the front surface 16 and/or the back surface 18 of the base lens 12 by direct machining or mechanical etching of the molding surfaces that form the front surface 16 and/or the back surface 18 of the base lens 12. Such molding surfaces include injection molding surfaces and cast molding surfaces. After molding, the lens 10 is removed from the lens mold with the array 14 molded directly in or on the front surface 16 and/or the back surface 18 of the lens 10.

In certain embodiments of the present invention, the microlenses 20 of the array 14 are formed on the front surface 16 and/or the back surface 18 of the base lens 12 by what is referred to as additive methods. For example, the microlenses 20 of the array 14 are formed on the front surface 16 and/or the back surface 18 of the base lens 12 by the direct addition of a same material as employed to form the base lens 12; the addition of a different material than employed to form the base lens 12 on to the front surface 16 and/or the back surface 18 of the base lens 12; or a combination thereof.

In certain embodiments of the present invention, the microlenses 20 of the array 14 are formed on the front surface 16 and/or the back surface 18 of the base lens 12 by vapor deposition processes, such as chemical or physical vapor deposition. For example, in one experiment, arrays of microlens having diopters in the range of one to two were fabricated on a front surface of finished, single vision lenses having a plano power. The arrays were produced by placing wire screens having either squared, rectangular, or diamond shaped openings with a maximum dimension of approximately 0.50 to 1.00 millimeters on an optical surface of each lens. The masked lenses were subjected to sputter deposition of approximately 10,495 angstroms of zirconium dioxide having an index of refraction of approximately 2.1. The thickness of the individual microlenses of the array was achieved using time and joules/second with a substrate at a constant revolving at approximately 100 revolutions per minute on a rotating carousel.

Local optical power readings were obtained across different regions of the arrays on the lenses produced. The resulting optical power readings for different microlenses ranged from zero to more than five diopters with the variations between adjacent microlenses in the range of one to three diopters. Multiple optical power readings for a single microlens showed little variation, e.g. variations in the range of a few hundredths of a diopter.

Figures 22, 23:
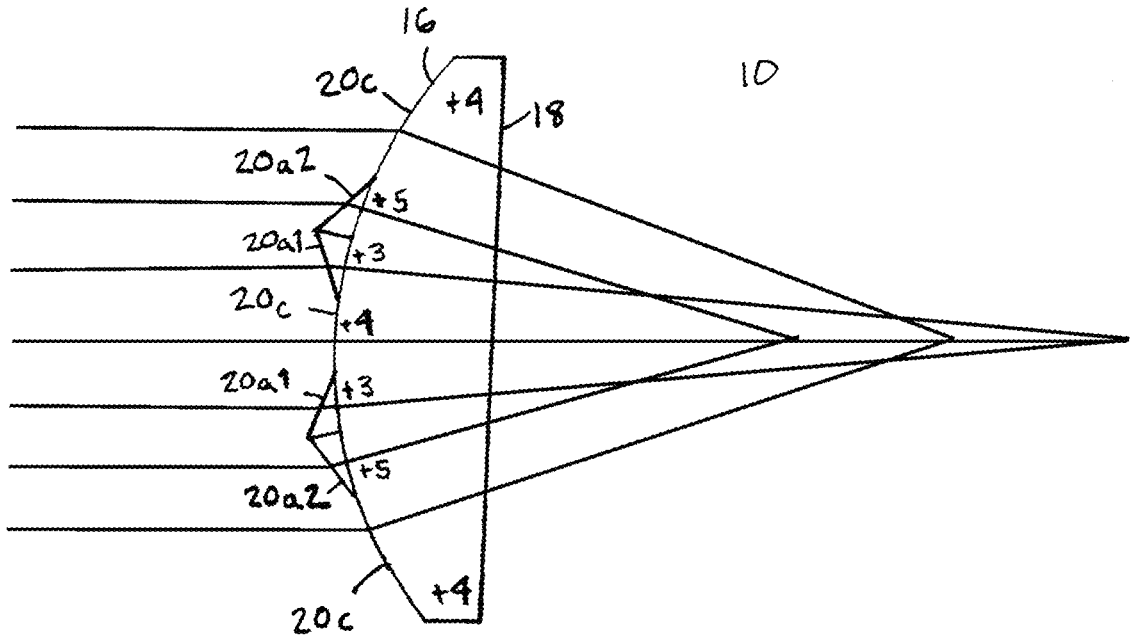
FIG. 22 is a cross-sectional view of a lens employing a microlens array according to one embodiment of the present invention.
FIG. 23 is a chart showing measured properties of a lens employing a microlens array according to one embodiment of the present invention.

FIGS. 23-26 show optical data for an example lens formed as described above. More particularly, FIG. 23 shows sphere power readings of the microlenses of the array on the lenses produced. The power readings are distributed over a 15-by-15 grid that covers a 40-by-40 millimeter square region of the lens, i.e. the step size between readings is about 40/15=2.67 millimeters. However, the microlenses formed are less than 1 millimeter in width. Hence, each power reading is the combined power provided by the cluster of microlenses enclosed by each of the 2.67 millimeter width covered by each reading. The power readings are in the range of approximately zero to six diopters. At the center of the lens, the sphere power reading is 1.38 diopters, the adjacent power reading to the right is 0.19 diopters, and the following power reading is 2.90 diopters. These significant power jumps from one reading to the next are observed across the entire region measured. The power jumps are a result of the different powers of the microlens of the microlens array formed. Such power jumps would not be possible in a traditional or conventionally formed multifocal ophthalmic lens.

Figure 25:
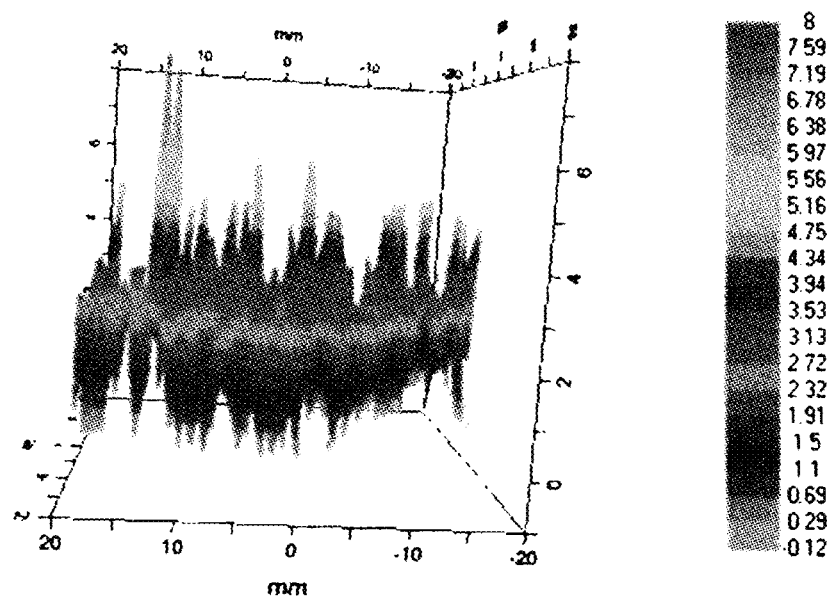
FIG. 25 is a chart showing measured properties of a lens employing a microlens array according to one embodiment of the present invention.

FIG. 25 shows sphere power readings of the same lens described with regard to FIG. 23. The readings are shown in a three-dimensional plot in which the z-axis represents the sphere power. The significant power jumps between adjacent regions result in a three-dimensional plot that has the appearance of many stalactites and stalagmites clustered together.

Figure 24:
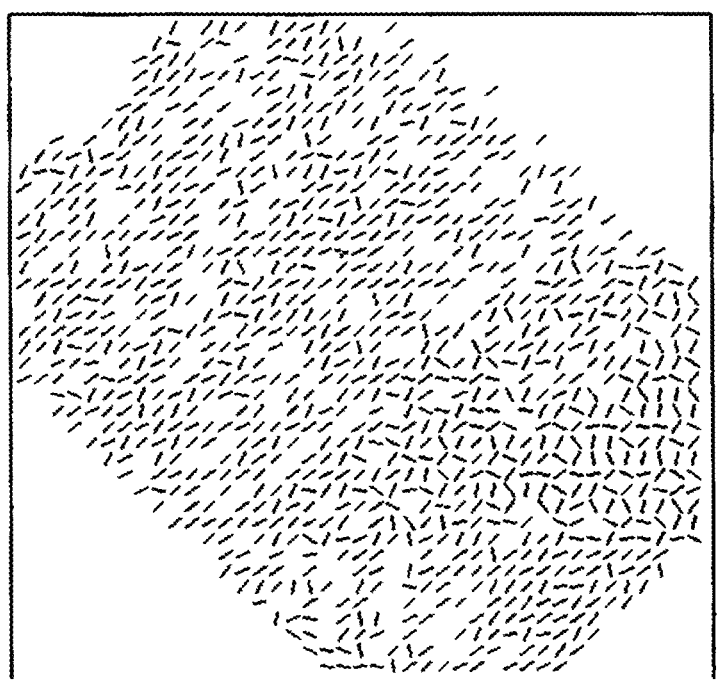
FIG. 24 is a chart showing measured properties of a lens employing a microlens array according to one embodiment of the present invention.

FIG. 24 shows cylinder axis power readings of the same lens described with regard to FIG. 23. It is observed that the cylinder axis varies significantly from one reading to the next across the entire region.

Figure 26:
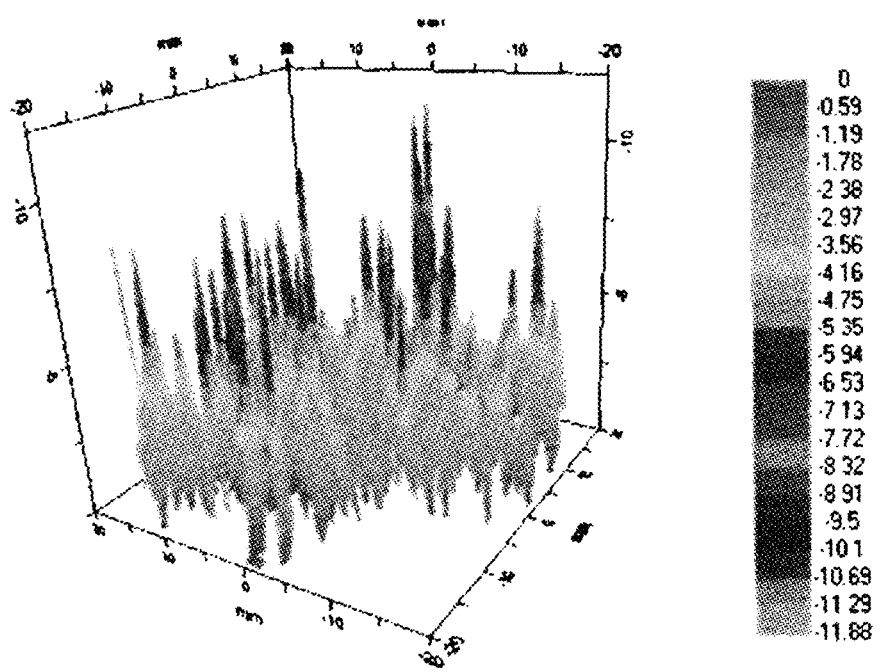
FIG. 26 is a chart showing measured properties of a lens employing a microlens array according to one embodiment of the present invention.

FIG. 26 shows cylinder power readings of the same lens described with regard to FIG. 23 in a three-dimensional plot in which the z-axis represents the cylinder power.

At a typical vertex distance of 11 to 15 millimeters in front of a viewer's eye, the viewer could resolve the optical power change on the lens surface of the lenses described above due to the presence of the microlens.

In certain embodiments of the present invention, the microlenses 20 of the array 14 are formed on the front surface 16 and/or the back surface 18 of the base lens 12 by a combination of the above described subtractive methods, a combination of the above described additive methods, or combination of the above described additive methods and subtractive methods.

In certain embodiments of the present invention, the microlenses 20 of the array 14 are formed on the front surface 16 and/or the back surface 18 of the base lens 12 by photolithography, optical lithography, and/or ultraviolet lithography known by those skilled in the art. One skilled in the art will recognized that depending upon the exact process of such techniques, the method can be considered additive, subtractive or a combination thereof. Such techniques allow for the control of the orientation of the surface of the microlenses 20 or the array 14 in order to refract the principal light ray in the desired direction. The photoresist may be developed by a laser.

In certain embodiments of the present invention, the microlenses 20 of the array 14 are formed on a surface of the thin film or a surface of a thin film laminate through any one of the herein described subtractive methods, additive methods, or a combination thereof. The resulting thin film or thin film laminate having an array 14 formed thereon is then incorporated into an ophthalmic lens through an insert or wafer injection molding process or through an insert or wafer cast molding process. Exemplary insert or wafer injection molding processes are described in the assignee's U.S. Pat. No. 5,757,459. Such thin film or thin film laminate may be formed of polycarbonate, polyethylene terephthalate, polyvinyl alcohol or other suitable thin film. The thin film or thin film laminate may be incorporated into an interior of the base lens 12 or on an optical surface 16 and/or 18 of the base lens 12.

The base lens 12 according to the present invention is, for example, formed of glass, crystalline quartz, fused silica, or soda-lime silicate glass. In certain embodiments of the present invention base lens 12 is formed of a plastic bulk material or resin suitable for cast or injection molding. For example, such materials include polymers based on allyl diglycol carbonate monomers (such as CR-39 available from PPG Industries, Inc. and SPECTRALITE and FINALITE Sola International Inc.) and polycarbonates (such as LEXAN available from General Electric Co.).

In certain embodiments of the present invention, the lens according to the present invention may be transparent or may employ an active or static coloring substrate mixed directly into the bulk material or resin. Such optical articles may further employ additional functional characteristics in the form of coatings, laminates, thin film inserts, and/or thin film laminates. The functional attributes of such films, laminates, or coatings may include, for example, coloration, tinting, hard coating, polarization, photochromism, electrochromism, UV absorption, narrow band filtering, and easy-cleaning.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An ophthalmic spectacle lens comprising:
a base lens substrate of a spectacle lens having a front surface and a back surface;
said base lens of a spectacle lens having a low-frequency curve;
a plurality of microlenses disposed on at least one of said front surface and said back surface of said base lens substrate of a spectacle lens;
each of said microlenses having a static local curvature;
said local curvature of at least one of said plurality of microlenses being different than the low-frequency curve of said base lens of a spectacle lens.

2. The ophthalmic spectacle lens according to claim 1, wherein said plurality of microlenses are disposed on said front surface.

3. The ophthalmic spectacle lens according to claim 1, wherein an effective curvature power of said lens is obtained by adding a power associated with said low-frequency curve to a power associated with said local curvature.

4. The ophthalmic spectacle lens according to claim 1, wherein said plurality of microlenses are semi-circular.

5. The ophthalmic spectacle lens according to claim 1, wherein said local curvature of some of the plurality of microlenses is the same as the low-frequency curve of said base lens.

6. The ophthalmic spectacle lens according to claim 1, wherein the geometry of the microlens is the property that primarily functions to define the optical power of the microlens.

7. The ophthalmic spectacle lens according to claim 1, wherein a power associated with said low-frequency curve is zero.

8. The ophthalmic spectacle lens according to claim 1, wherein said plurality of microlenses are located over a substantial entirety of a front surface of said base lens substrate.

9. The ophthalmic spectacle lens according to claim 1, wherein a plurality of said plurality of microlenses has a concave effective curvature.

10. The ophthalmic spectacle lens according to claim 1, wherein optical power of said microlens is primarily defined by a refractive index of said microlens.

\* \* \* \* \*